United States Patent Office

DAVID HENDRICK TAYLOR, OF WESTFIELD, NEW YORK.

Letters Patent No. 108,846, dated November 1, 1870.

IMPROVEMENT IN FINISHING AND BLEACHING HANDLES, &c.

*The Schedule referred to in these Letters Patent and making part of the same.*

I, DAVID HENDRICK TAYLOR, of Westfield, in the county of Chautauqua and State of New York, have invented an improved Method of Finishing Wooden Handles, and other like articles, of which the following is a specification.

My invention is designed especially for that class of handles made of hard wood, such as the handles of forks, rakes, hoes, shovels, &c., and also for oars, bats, and the like.

These are usually made from ash or hickory timber, and a preference is had for that of a white color as having the most pleasing appearance; but only a small proportion of the timber procurable and adapted to this purpose is of this color, viz., that from young trees, and the sap or outer part of large trees, the inner portion acquiring a dark or reddish color as the tree attains age or size. This portion possesses every requisite of strength and durability, much of it excelling the white portions in these respects, and is lacking only in the quality of appearance.

My improvement consists in finishing handles, oars, and other like wares, when made of the darker colored portions of the timber, by immersion, after they are turned or worked into shape, in a bath of chloride of lime or bleaching-powder, or any aqueous solution charged with chlorine gas, until the wood is bleached to a sufficient depth to endure ordinary wear.

After removal and drying, the application of sandpaper or other suitable polishing material, sufficiently to restore a smooth surface where the fibers have been raised by absorbing the moisture, with the addition, if desired, of oil or varnish, leaves them with a beautiful finish and satin-like luster, and as white as could be desired.

Finished in this manner they are more pleasing to the eye, their market-value is largely enhanced, and their durability increased, the latter effect being due to the preservative effect of the chlorine, which neutralizes the acidity of the sap when the timber is not fully seasoned, dissolves out the vegetable gums from the pores, and destroys the natural coloring matter contained in the wood, while it indurates the surface and prevents the attack of insects.

By this process much timber, valuable for its strength and toughness of fiber, but which would be rejected on account of its unsuitableness of color, is rendered useful, and an important saving in the manufacture effected.

For ordinary purposes, such as tool-handles, &c., it is sufficient that the chlorine treatment is continued only long enough to penetrate well the outside of the wood; but it may be desirable in some articles, particularly those of small size, to have the solution permeate entirely through them, so as to insure its antiseptic and indurating effects throughout the structure of the wood.

This may be done by forcing the solution into the pores by means of hydraulic pressure, and in various other ways.

I do not confine myself to the bleaching agent, or the mode of application herein specified, as various methods of accomplishing the same results are obvious.

I claim as an improved article of manufacture—

1. Wood handles, oars, and like articles, when finished in the manner substantially as herein set forth.

2. The process of treating wood for handles and other purposes, by the application of a chlorine bath or other bleaching material, as and for the purpose described.

In witness whereof, I have hereunto signed my name in the presence of two subscribing witnesses.

D. H. TAYLOR.

Witnesses:
J. K. DRAKE,
ALBERT HAIGHT.